(12) United States Patent
Khi et al.

(10) Patent No.: US 11,095,646 B2
(45) Date of Patent: Aug. 17, 2021

(54) METHOD AND SYSTEM FOR DATA SECURITY WITHIN INDEPENDENT COMPUTER SYSTEMS AND DIGITAL NETWORKS

(71) Applicant: Zamna Technologies Limited, London (GB)

(72) Inventors: Irra Ariella Khi, London (GB); Aleksandr Gorelik, RishonLeTsiyon (IL)

(73) Assignee: Zamna Technologies Limited, London (GB)

( * ) Notice: Subject to any disclaimer, the term of this patent is extended or adjusted under 35 U.S.C. 154(b) by 295 days.

(21) Appl. No.: 16/031,433

(22) Filed: Jul. 10, 2018

(65) Prior Publication Data

US 2019/0014116 A1 Jan. 10, 2019

Related U.S. Application Data

(60) Provisional application No. 62/530,755, filed on Jul. 10, 2017.

(51) Int. Cl.
| | |
|---|---|
| *H04L 9/32* | (2006.01) |
| *H04L 29/06* | (2006.01) |
| *G06F 21/44* | (2013.01) |
| *G06F 21/62* | (2013.01) |
| *H04L 9/30* | (2006.01) |
| *H04L 9/08* | (2006.01) |
| *H04L 9/06* | (2006.01) |
| *H04W 12/02* | (2009.01) |

(52) U.S. Cl.
CPC .......... *H04L 63/0892* (2013.01); *G06F 21/44* (2013.01); *G06F 21/6245* (2013.01); *H04L 9/0637* (2013.01); *H04L 9/0861* (2013.01); *H04L 9/302* (2013.01); *H04L 9/3239* (2013.01); *H04L 9/3271* (2013.01); *H04L 63/0823* (2013.01); *H04L 63/0884* (2013.01); *H04L 63/12* (2013.01); *H04W 12/02* (2013.01); *H04L 2209/38* (2013.01); *H04L 2463/062* (2013.01)

(58) Field of Classification Search
CPC ... G06F 21/44; G06F 21/6245; H04L 9/3271; H04L 9/0637; H04L 9/302; H04L 9/3239; H04L 9/0861; H04L 63/0892; H04L 63/12; H04L 63/0823; H04L 63/0884; H04L 2209/38; H04L 2463/062; H04W 12/02
USPC ......................................................... 713/168
See application file for complete search history.

(56) References Cited

U.S. PATENT DOCUMENTS

| | | | |
|---|---|---|---|
| 7,058,808 B1 | 6/2006 | Zolotorev et al. | |
| 7,068,787 B1 | 6/2006 | Ta et al. | |
| 7,653,712 B1 | 1/2010 | Dubrovsky et al. | |
| 9,069,979 B2 | 6/2015 | Srinivasan et al. | |

(Continued)

OTHER PUBLICATIONS

WO, International Search Report and Written Opinion, Application No. PCT/IB2018/000855, dated Oct. 9, 2018.
Zyskind, Guy, et al., "Decentralizing Privacy: Using Blockchain to Protect Personal Data," The Institute of Electrical and Electronics Engineers, Inc. (IEEE) Conference Proceedings, (May 1, 2015) p. 180, XP055360065.

(Continued)

*Primary Examiner* — Amare F Tabor
(74) *Attorney, Agent, or Firm* — Goodwin Procter LLP

(57) ABSTRACT

A system and method for authentication, authorization, and access management based on personally identifiable information and data sets pertaining to individual identity and its attributes within independent computer systems and digital networks.

18 Claims, 15 Drawing Sheets

(56) References Cited

U.S. PATENT DOCUMENTS

| | | | |
|---|---|---|---|
| 9,276,942 B2 | 3/2016 | Srinivasan et al. | |
| 9,396,341 B1 | 7/2016 | Chandra et al. | |
| 9,767,299 B2 | 9/2017 | Selgas et al. | |
| 10,025,797 B1 | 7/2018 | Fonss | |
| 10,063,529 B2* | 8/2018 | Milazzo | H04L 63/0442 |
| 10,361,869 B2* | 7/2019 | Gorman | H04L 9/3263 |
| 10,425,399 B2* | 9/2019 | Kravitz | G06F 21/645 |
| 10,580,100 B2* | 3/2020 | Pierce | H04L 63/0435 |
| 10,621,150 B2* | 4/2020 | Callan | G06F 16/211 |
| 2003/0177016 A1 | 9/2003 | Lawhorn et al. | |
| 2005/0021431 A1 | 1/2005 | Schnoerer et al. | |
| 2007/0083460 A1 | 4/2007 | Bachenheimer | |
| 2008/0021834 A1 | 1/2008 | Holla et al. | |
| 2008/0294895 A1 | 11/2008 | Bodner et al. | |
| 2010/0215175 A1 | 8/2010 | Newson et al. | |
| 2011/0302634 A1 | 12/2011 | Karaoguz et al. | |
| 2012/0221854 A1 | 8/2012 | Orsini et al. | |
| 2012/0226792 A1 | 9/2012 | Johnson et al. | |
| 2014/0136832 A1 | 5/2014 | Klum et al. | |
| 2014/0331061 A1 | 11/2014 | Wright et al. | |
| 2014/0351891 A1 | 11/2014 | Grube et al. | |
| 2014/0359282 A1 | 12/2014 | Shikfa et al. | |
| 2015/0269774 A1 | 9/2015 | Lissone | |
| 2015/0371052 A1 | 12/2015 | Lepeshenkov et al. | |
| 2016/0112455 A1 | 4/2016 | Zhou | |
| 2016/0267637 A1 | 9/2016 | Hsiao et al. | |
| 2016/0373419 A1 | 12/2016 | Weigold et al. | |
| 2017/0046698 A1 | 2/2017 | Haldenby et al. | |
| 2017/0075941 A1* | 3/2017 | Finlow-Bates | H04L 9/3239 |
| 2017/0111175 A1 | 4/2017 | Oberhauser et al. | |
| 2017/0116693 A1* | 4/2017 | Rae | H04L 9/3236 |
| 2017/0161439 A1 | 6/2017 | Raduchel et al. | |
| 2017/0279783 A1 | 9/2017 | Milazzo et al. | |
| 2017/0286717 A1 | 10/2017 | Khi et al. | |
| 2017/0352031 A1* | 12/2017 | Collin | G06Q 30/06 |
| 2018/0300493 A1 | 10/2018 | Li et al. | |
| 2018/0330079 A1* | 11/2018 | Gray | H04L 9/3247 |
| 2019/0050856 A1* | 2/2019 | Vintila | G06Q 20/3829 |
| 2019/0066065 A1* | 2/2019 | Wright | G06Q 20/06 |
| 2019/0066228 A1* | 2/2019 | Wright | G06F 16/1834 |
| 2019/0303887 A1* | 10/2019 | Wright | H04L 9/3234 |
| 2020/0295934 A1 | 9/2020 | Diaz Vico et al. | |

OTHER PUBLICATIONS

Ali, Muneeb, et al., "Blockstack: Design and Implementation of a Global Naming System with Blockchains", Draft v4; accepted for publication at 2016 USENIX Annual Technical Conference (USENIX ATC'16) 13 pages.

BCS Identity Assurance Working Group, "Aspects of Identity Yearbook 2015-16, How to recognize a good online identity scheme", pp. 1-4.

Erway, C. Chris, et al., "Dynamic Provable Data Possession", Nov. 29, 2009, pp. 1-22, Brown University, Providence, RI.

International Search Report & Written Opinion, Application No. PCT/IB2018/001533, dated Apr. 29, 2019.

International Search Report and Written Opinion, International Application No. PCT/IB2017/000632, dated Jul. 28, 2017.

Micali, Silvio, et al., "Zero-Knowledge Sets", Laboratory for Comp. Sci, MIT, Cambridge, MA 02138: Dept. of Applied Sci, Harvard, Univ., Cambridge, MA 02138, Research at Harvard Univ. by NSF Grant ITR 0205423; NEC Laboratories, America joe@nec-labs.com; 12 pages.

Notification of the First Office Action, Chinese Patent Application 201380072165.3, dated Feb. 28, 2017.

Robles, Klara, "The Path to Self-Sovereign Identity", WebOfTrustInfo / ID2020designWorkshop, Apr. 26, 2016, 7 pages.

Scott, Michael, "M-Pin: A Multi-Factor Zero Knowledge Authentication Protocol," Chief Cryptographer, Certivox Labs, mike.scott@certivox.com; pp. 1-12.

Smith, Samuel M., et al., "Identity System Essentials", Evernym, Mar. 29, 2016, 16 pages.

Snow, Paul, et al., "Factom: Business Processes Secured by Immutable Audit Trails on the Blockchain", www.Factom.org; Ver. 1.0, Nov. 17, 2014, pp. 1-38.

Tobin, Andrew, et al., "White Paper—The Inevitable Rise of Self-Sovereign Identity", Sorvin, Identity for all, Sorvin Foundation, sorvin.org; Sep. 29, 2016, pp. 1-23.

Vaughan, Wayne, et al., "Chainpoint—A scalable protocol for recording data in the blockchain and generating blockchain receipts", V. 1.0, Jul. 22, 2015, 6 pages.

Wilkinson, Shawn, et al., "Storj: A Peer-to-Peer Cloud Storage Network", V. 1.01, Dec. 15, 2014, pp. 1-18.

* cited by examiner

METHOD AND SYSTEM FOR DATA SECURITY WITHIN INDEPENDENT COMPUTER SYSTEMS AND DIGITAL NETWORKS

CROSS REFERENCE TO RELATED APPLICATIONS

This application claims priority to U.S. Provisional Patent Application Ser. No. 62/530,755, filed on Jul. 10, 2017, and is related to commonly-assigned, co-pending U.S. application Ser. No. 15/480,313, filed Apr. 5, 2017, which claims priority to U.S. Provisional Patent Application Ser. No. 62/318,648, filed on Apr. 5, 2016, and is also related to commonly-assigned, U.S. Provisional Patent Application Ser. No. 62/595,416, filed on Dec. 6, 2017, and which applications are hereby incorporated by reference in their entireties and for all purposes.

FIELD

The present disclosure relates to data security, and more specifically, but not exclusively, to a system and method for authentication, authorization, and access management based on personally identifiable information and data sets pertaining to individual identity and its attributes within independent computer systems and digital networks.

BACKGROUND

Binary methods of authentication for a service or system—whether one-factor authentication (1FA) or two-factor authentication (2FA)—can be less than secure to deliver a high integrity of data assurance and data provisioning for personal access to sensitive information and/or services for an individual. Even 2FA is subject misuse, tampering, and/or security compromise—especially when the primary second factor is short message service (SMS), which can be compromised through the gateway.

Trust should never have a binary state. Trust-based decisions cannot be answered in a simply yes or no fashion. Rather, trust-based decisions should account for an aggregation of every data point that a particular party has access to. A need exists for constant aggregation of every trust, reputational, and behavioral data point to provide enough confidence and assurance for a decision making process.

There are two fundamental challenges. First, aggregating a large volume of sensitive personal information creates a highly valued hacker target. However, an aggregate of verified personal information can avoid security issues, for example, with incoming data from third party sources. Therefore, better security is needed for aggregated data. Second, legislation—particularly in Europe—is making this task even harder. The General Data Protection Regulation limits how and what type of data can be collected, shared, stored, and protected.

Unfortunately, conventional solutions not only fail to capture the full spectrum of data due to the sensitivity of the personal data, but also put personal data at risk by using conventional storage and retrieval methods. These conventional systems also fail to ensure that such sensitive data, or insights derived thereof, can be shared, let alone in real time, as part of decision making. There is currently no way to deal with the added legal complexity that personal data at large—and passenger data in particular—is both very sensitive and not able to be stored centrally for privacy legislations. In part, current solutions store the data in either a fragmented form or simply offline, thereby failing to solve the need to effectively use or share that data in real-time. Overall, this conventional approach fails to comply with regulations and privacy legislation. A need exists to share personal data without actually sharing the open, underlying information about the person or a passenger.

In view of the foregoing, a need exists for an improved system for data security management in an effort to overcome the aforementioned obstacles and deficiencies of conventional data security systems

Figure 1:
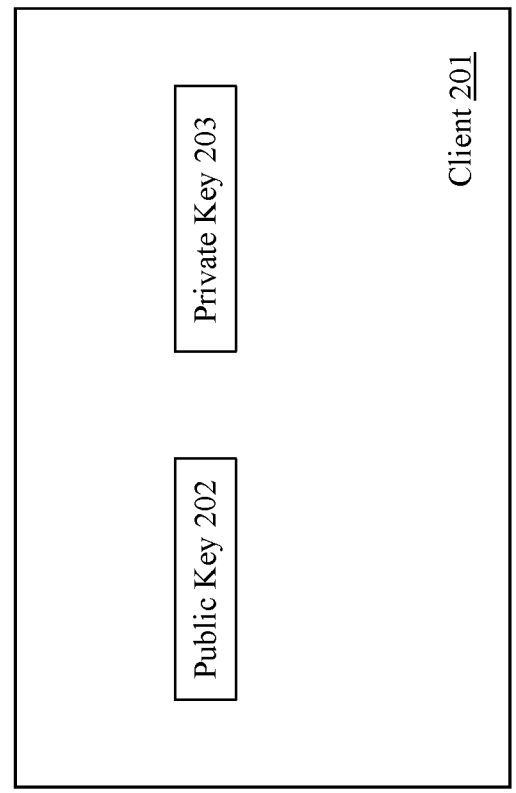
FIG. 1 is an exemplary block diagram illustrating one embodiment of a data security management system having a client with a pair of cryptographic keys.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available data security systems are deficient because they are unable to both protect sensitive data by its decentralization and ensure that this data will have verifiable integrity and consistency in a decentralized environment without revealing any part of the original, underlying data, a system for data security management can prove desirable and provide a basis for a wide range of data management applications, such as managing passenger data that is both very sensitive and not stored (or stored in fragmented form and offline). These goals can be achieved, according to one embodiment disclosed herein, by a data security management system 100 as illustrated in FIG. 1. The data security management system 100 advantageously protects decentralized data and ensures that this data will have verifiable integrity and consistency.

Turning to FIG. 1, the data security management system 100 is shown as including a client 201 that generates a cryptographic key pair comprising a public key 202 and a private key 203. The client 201 can include any mobile device, personal computing device, mobile telephone, smartphone, tablets, desktop computers, and Internet of Things (IoT) devices. Although shown and described using a single client 201, the data security management system 100 can support any number of clients 201 as desired.

Figure 2:
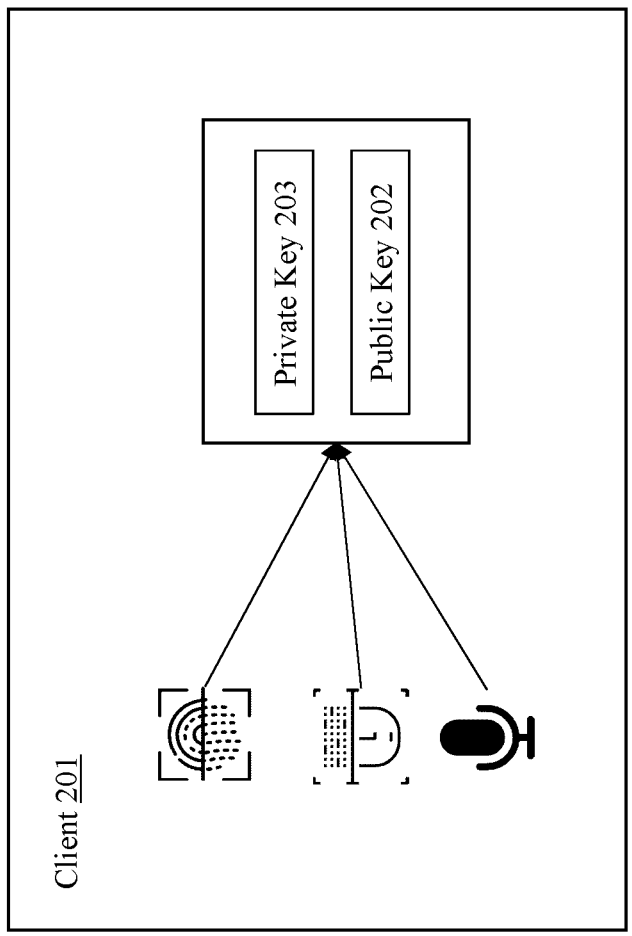
FIG. 2 is an exemplary block diagram illustrating one embodiment of a data flow for the generation of the pair of cryptographic keys of FIG. 1 based on biometric data.

In a preferred embodiment, each client 201 can generate at least one pair of cryptographic keys: the public key 202 and the associated private key 203. The private key 203 is preferably a large cryptographic secret key. In some embodiments, the data security management system 100 can include at least one client-side processor (not shown) configured to generate these key pairs. In yet another one embodiment, the private key 203 can be stored on the client 201 in a special vault (not shown). In an alternative embodiment, the private key 203 can be stored within the operating memory (not shown) of the client 201. In some other embodiments, such as shown on FIG. 2, the pair of cryptographic keys can be generated from client biometric data, for example, by way of biometric feature extraction (e.g., face, fingerprints, voice, retina recognition, and so on). Because the same biometric features should produce identical cryptographic key pairs, these keys need not be stored anywhere at all. Stated in another way, each time the private key 203 and the public key 202 are needed, they can be dynamically generated using biometric data from the client 201. The generation of the public key 202 and the private key 203 is also described in commonly-assigned, co-pending application Ser. No. 15/480,313, entitled "Method and System for Managing Personal Information Within Independent Computer Systems and Digital Networks," the disclosure of which is hereby incorporated by reference in its entirety.

Figure 3:
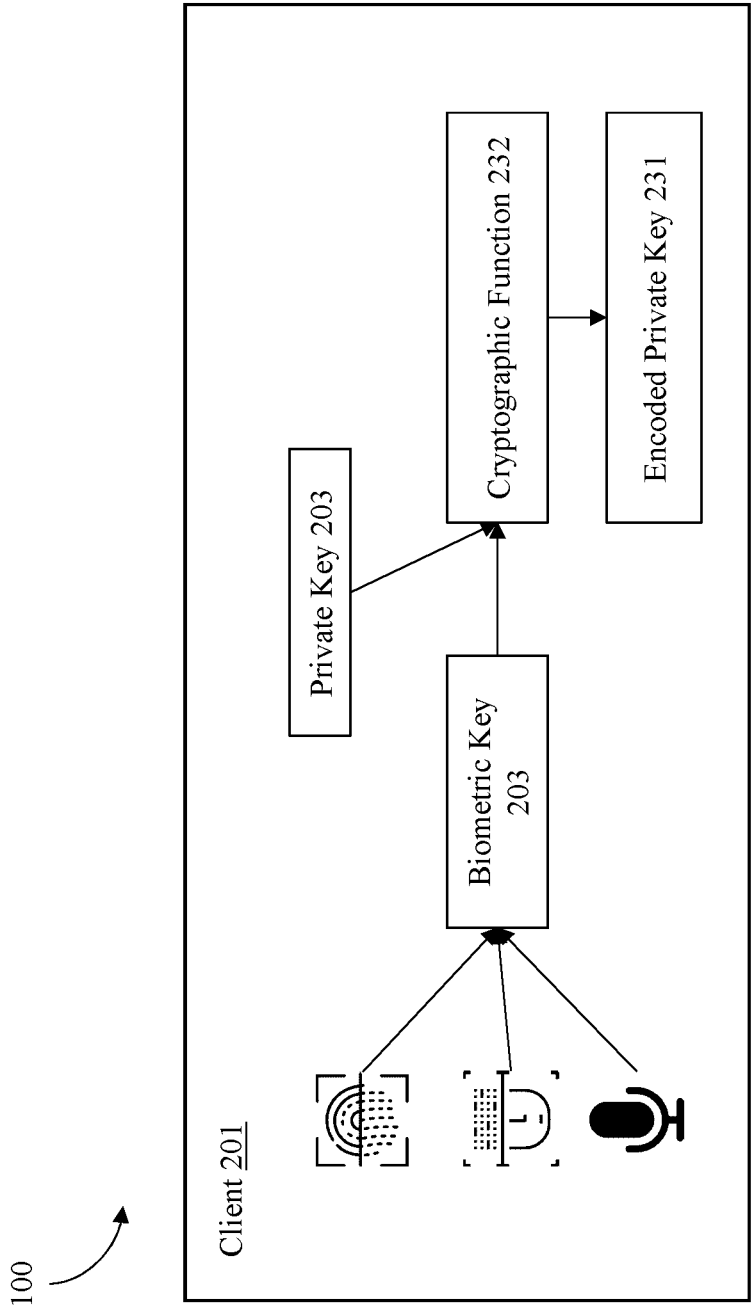
FIG. 3 is an exemplary block diagram illustrating one embodiment of a data flow for encoding the private key of FIG. 1 using biometric data.

In a preferred embodiment, as shown on FIG. 3, the private key 203 can be locked, protected, and/or encoded using a biometric identification (shown as a biometric key 203) and cryptographic function 232. In some embodiments the cryptographic function 232 includes cryptographic primitives such as a one-way hash function and/or an encryption function to produce an encoded private key 231 on the client 201. In some embodiments, the private key 203 can be locked, protected, and/or encoded using a password.

In another embodiment, the data security management system 100 comprises any combination, number, and/or sequence of private key protection techniques. In yet another one embodiment, the private key 203 need not be locked, encoded, and/or protected.

In a preferred embodiment, each generation of new key pairs on the client 201 is provided with creation of a new associated ledger ID smart contract 205 in a ledger 207. The ledger ID smart contract 205 includes a computer protocol intended to digital facilitate, verify, or enforce the negotiation or performance of a contract. The ledger ID smart contract 205 are trackable and irreversible to enable the performance of credible transactions without third parties. Control of the ID smart contract 205 can be protected using the private key 203. In this embodiment, one can access and/or control the ID smart contract 205 being in possession of only the private key 203. In another embodiment, the ID smart contract 205 can be protected using another private key (not shown), different from the private key 203. The data security management system 100 is suitable for use with a wide range of ledgers 207, such as any immutable distributed ledger, including, for example, a public Blockchain (e.g., Bitcoin® Blockchain, Ethereum® Blockchain, etc.) and/or a private Blockchain and/or the like. In some embodiments, the ledger 207 comprises a combination of public and/or private Blockchains. In another embodiment, the data security management system 100 comprises a controller smart contract 206 which can be the owner of the ledger ID smart contract 205.

Figure 4:
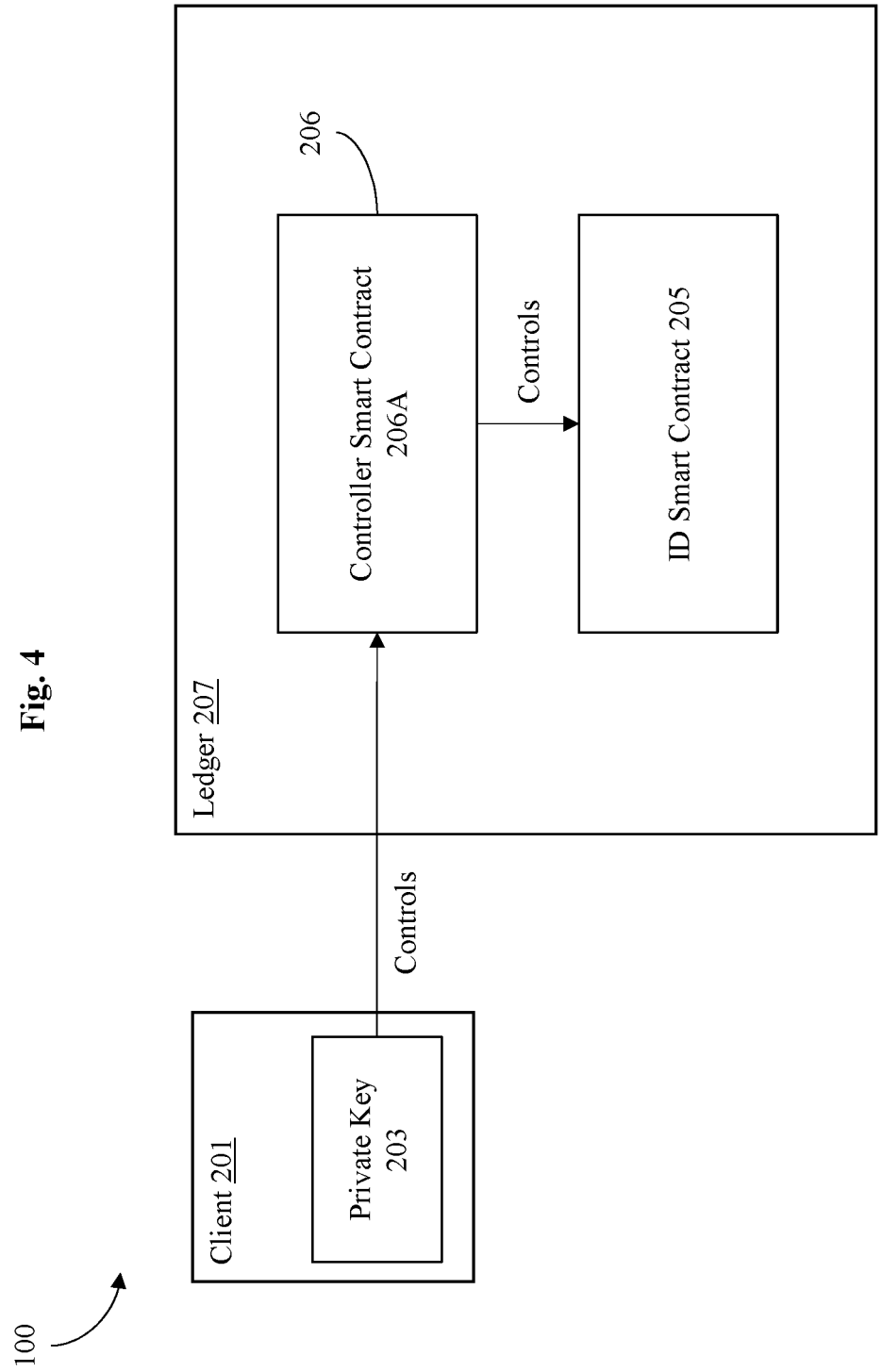
FIG. 4 is an exemplary functional block diagram illustrating one embodiment of control flow between the private key of FIG. 1 and smart contracts.
Figure 5:
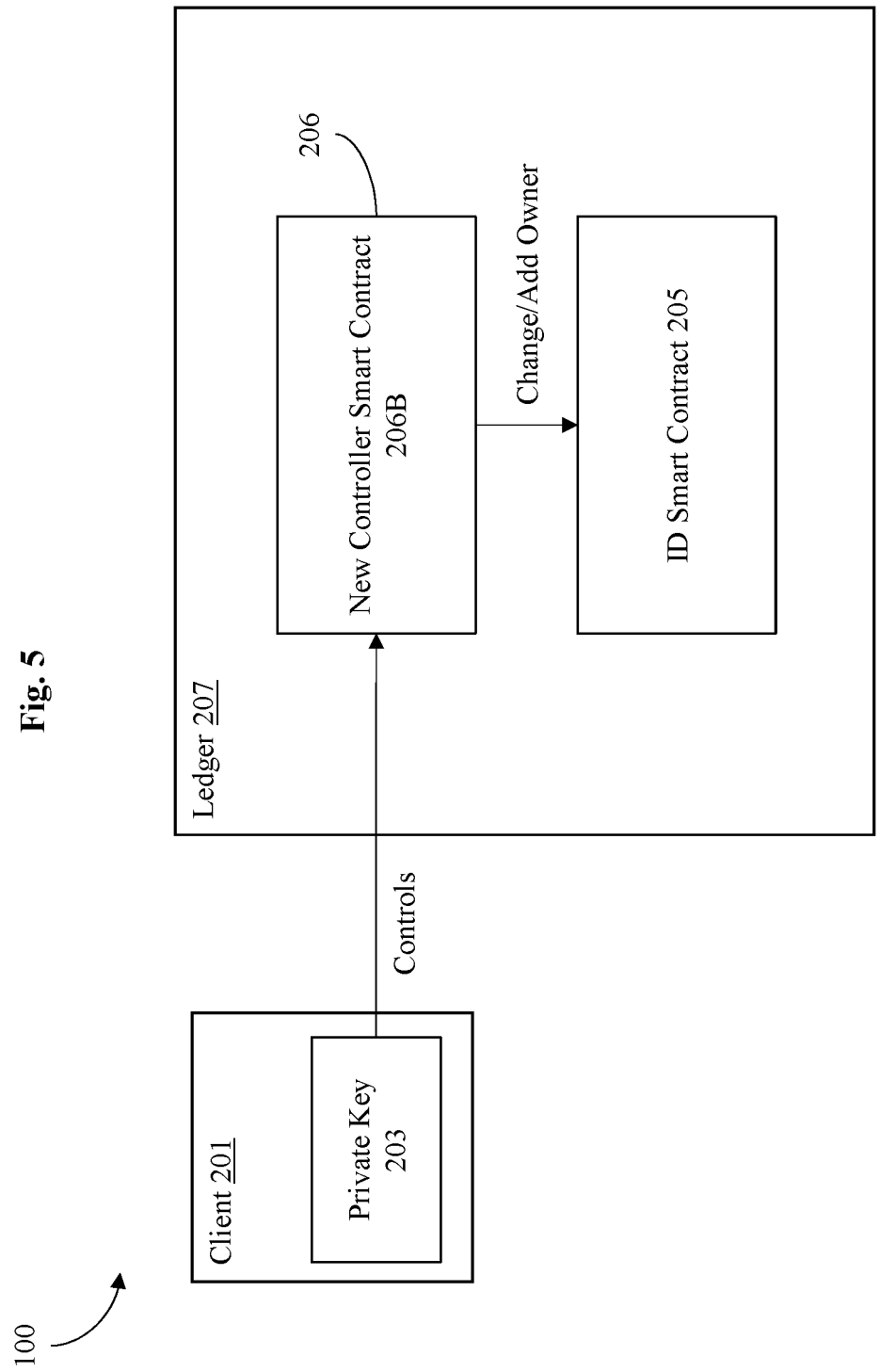
FIG. 5 is an exemplary functional block diagram illustrating one embodiment of a control data flow for changing ownership of ID smart contract of FIG. 4.

As shown on FIG. 4, the private key 203 can lock, protect, and control access to a ledger controller contract 206A. Only having access (e.g., being in the possession of the private key 203) to the controller smart contract 206 provides the client 201 with access to, and/or control of, the ID smart contract 205. This advantageously restores control of the ID smart contract 205 in the event of client migration to other devices or the loss of the private key 203 on the client 201. In other words, a new controller smart contract 206 can be generated and ownership of the ID smart contract 205 can be reassigned (or added) to a new controller smart contract 206B, such as shown on FIG. 5. In another embodiment, the data security management system 100 comprises any number of sequential smart contracts, each one in control of the following one, thereby forming a chain of control between each client 201 and ID smart contract 205.

Figure 6:
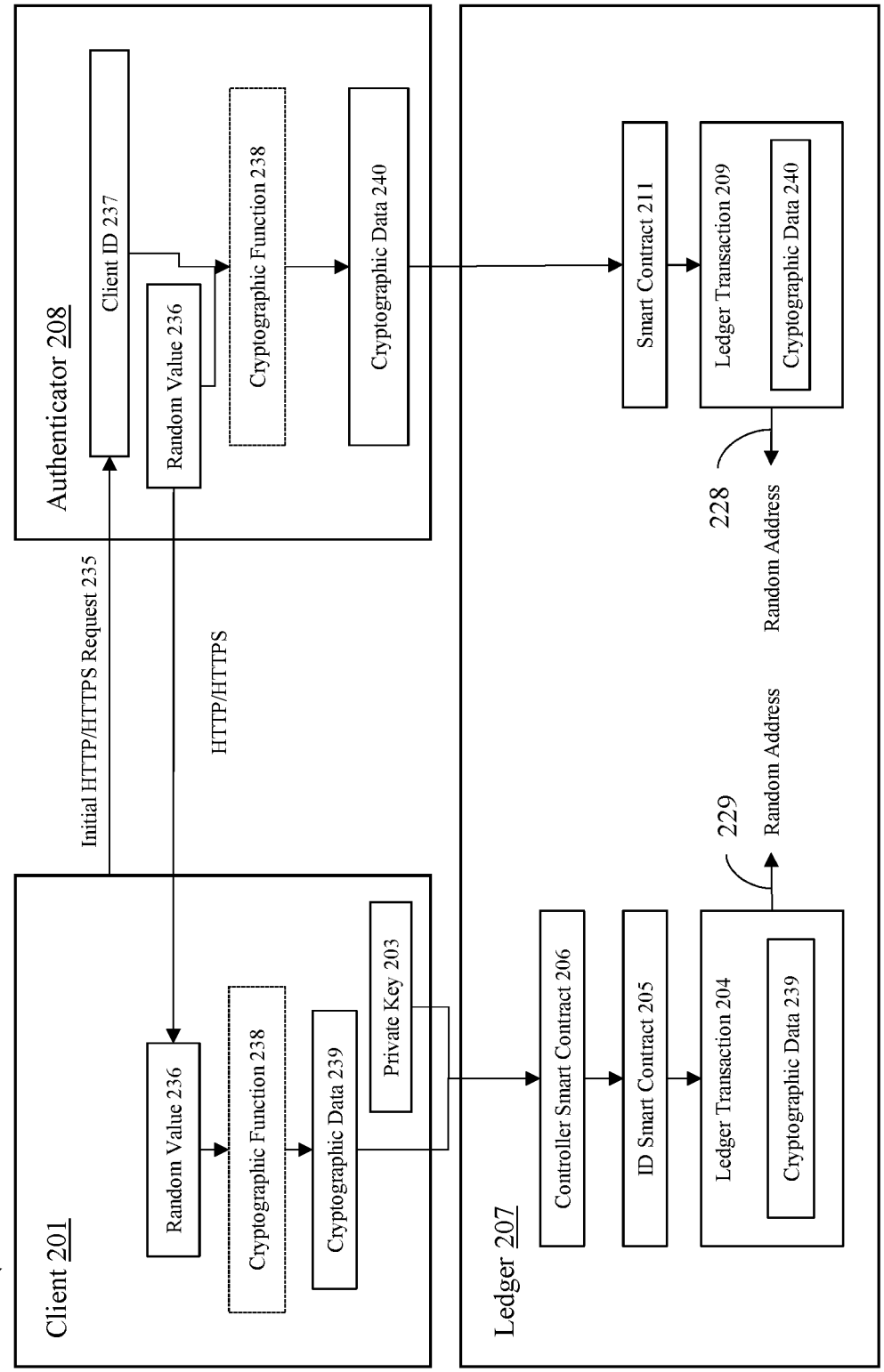
FIG. 6 is an exemplary functional block diagram illustrating one embodiment of an authentication process using transactions to a random recipient addresses using the data security management system of FIG. 1.

In a preferred embodiment, a ledger identifier (e.g., contract id) of the ID smart contract 205 is assigned by the ledger 207 and can represent a client identifier 237 of a selected client 201 in the data security management system 100, such as shown in FIG. 6. The client identifier 237 is preferably a unique value. For example, in an Ethereum contract, the client identifier 237 can be deterministically computed from the address of its creator and the number of transactions the creator sent at the moment of generation. In other example, the client identifier 237 can be a purely random value. In some embodiments, the public key 202 of the client 201 can represent the client identifier 237 of the selected client 201. In another embodiment, a ledger identifier of the controller smart contract 206 can represent the client identifier 237 of the selected client 201. In yet another one embodiment, the client 201 can manually select their client identifier 237. Alternatively, the client identifier 237 can be assigned externally to the data security management system 100. In other embodiments, the client identifier 237 can be derived from the public key 202, the ledger identifier of the ID smart contract 205, and/or the ledger identifier of the controller smart contract 206 by using a cryptographic function, such as, but not limited to, one-way hashing function (e.g., MD5, SHA-1, SHA-2, etc.).

In a preferred embodiment, an authentication process comprises at least one authentication response 229 represented by ledger transaction 204 made within ledger 207 from ID smart contract 205 and/or controller smart contract 206 (such as shown in FIG. 6). Only a client 201 is in possession of the private key 203, meaning that only the client 201 has access to, and is in control of, the ID smart contract 205 and/or the controller smart contract 206. Turning to FIG. 6, an example of an authentication process is shown. As shown, the client 201 can perform an initial authentication request 235, for example, over Hypertext Transfer Protocol (HTTP), HTTP Secure (HTTPS), and/or any other conventional data transfer protocol, to an authenticator 208. The authenticator 208 can generate a random value 236, which can be transferred back to the client 201, for example, over HTTP, HTTPS, and/or any other conventional data transfer protocols.

The authenticator 208, using the client identifier 237 and the random value 236, can produce a cryptographic data 240 using a cryptographic function 238. The cryptographic function 238 can include a one-way hashing function (e.g., MD5, SHA-1, SHA-2, etc.). The authenticator 208 produces a ledger request transaction 209 that includes the cryptographic data 240 via an authenticator smart contract 211. The authenticator 208 is the owner of the authenticator smart contract 211 on the ledger 207. The client 201, having the random value 236 from the authenticator 208, produces a cryptographic data 239 using the cryptographic function 238. In some embodiments, the private key 203 can be used with the random value 236 as inputs to the cryptographic function 238. Because the client 201 is in possession of the private key 203, the client 201 controls the controller smart contract 206, which is the owner of the ID smart contract 205. Using the private key 203 and the cryptographic data 239, the client 201 can produce at least one authentication response ledger transaction 204 that includes the cryptographic data 239.

Figure 7:
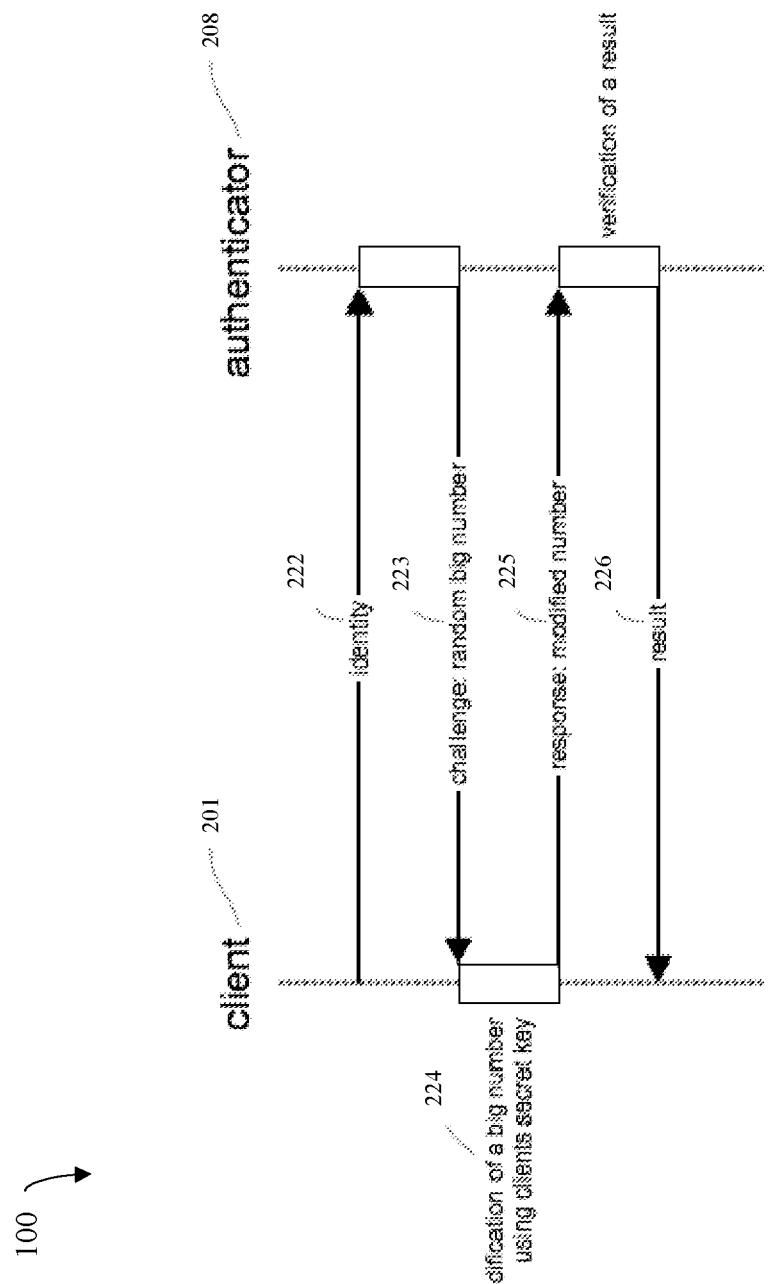
FIG. 7 is an exemplary data flow diagram illustrating one embodiment of a zero-knowledge authentication process that can be used the data security management system of FIG. 1.

In some embodiments, the authentication response ledger transaction 204 is a proof and/or verification of possession of the private key 203 by the client 201 to the authenticator 208 with or without any ledger 207 transaction(s). An example of such authentication process is shown in FIG. 7 as a sequence diagram of zero-knowledge authentication. As shown, the client 201 sends a special identity request 222 to the authenticator 208. The authenticator 208 responds to the client 201 with a challenge 223. By way of example, the challenge 223 can include a random big number, such as used by an RSA Factoring Challenge for encryption. The client 201 then makes the necessary modifications 224 of this big number using the private key 203 and sends the new, modified big number 225 back to the authenticator 208. The authenticator 208 checks the modified big number 225 from the client 201 and responds with a result 226 as to whether the challenge-response was correct.

In another embodiment, the authentication process is a modification of stored data fields within the ID smart contract 205 and/or controller smart contract 206 data fields requested by the authenticator 208 during the authentication process. Although not shown, in some embodiments, the authentication process of FIG. 7 generates a digital signature by the client 201 using the private key 203 over data received from the authenticator 208. In order to authenticate the client 201, the authenticator 208 validates this digital signature using the public key 202. In another embodiment, a zero-knowledge proof of the private key 203 knowledge can be generated on the client 201 and be provided to the authenticator 208 with or without any ledger 207 transaction(s) 204.

Returning to FIG. 6, the authentication response ledger transaction 204 can be made to the random recipient address that includes content that the authenticator 208 passes to the client 201 (for example, the random value 236 and/or the cryptographic data 239) in order to protect client and authenticator privacy. In other embodiments, the authentication response ledger transaction 204 can be made to the authenticator 208 ledger smart contract 211 directly, such as shown on FIG. 8.

Figure 8:
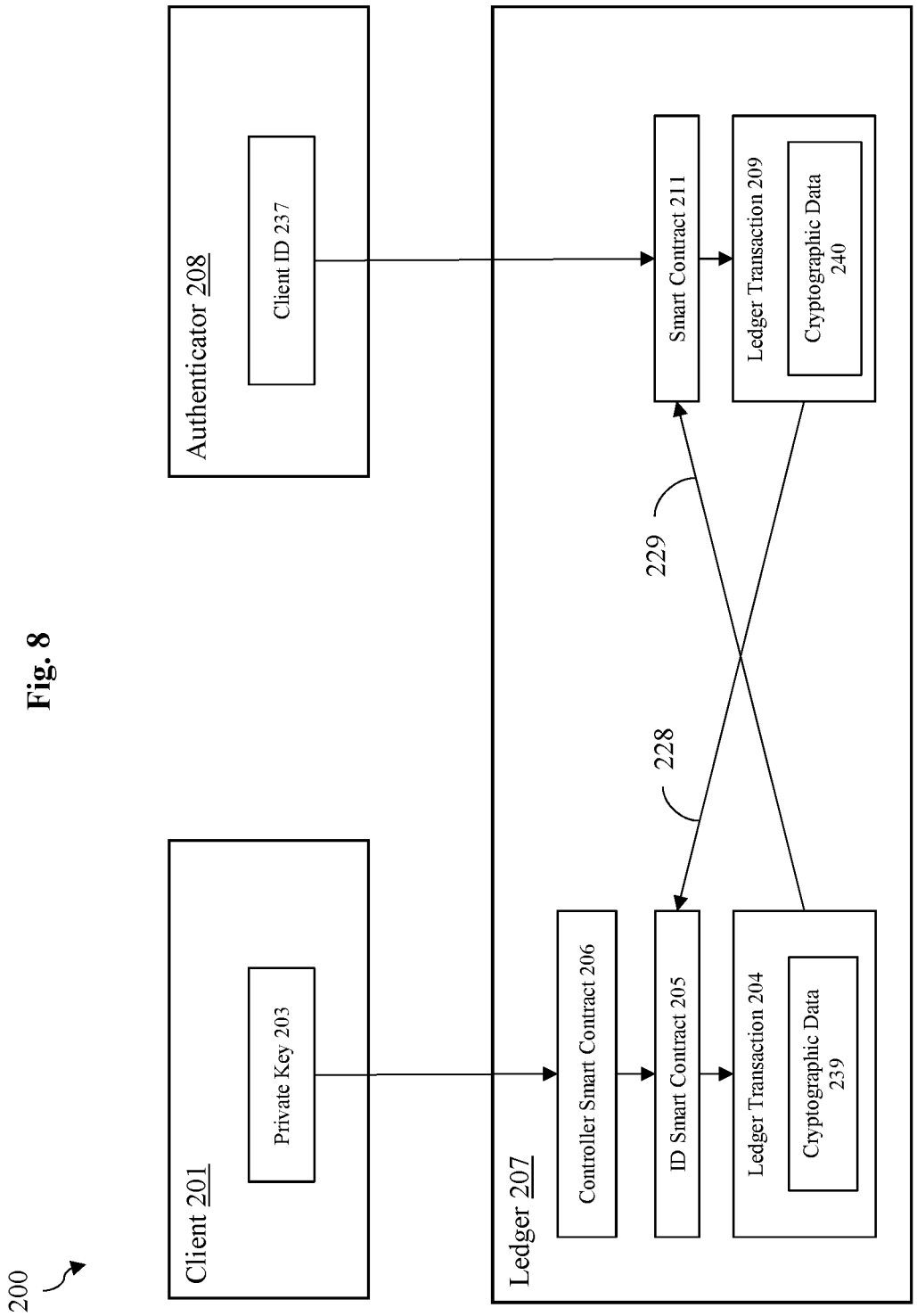
FIG. 8 is an exemplary functional block diagram illustrating one embodiment of an authentication process using transactions to direct recipient addresses using the data security management system of FIG. 1.

Turning to FIG. 8, an authentication request 228 can be produced by the authenticator 208 using an authentication request ledger transaction 209. In some embodiments, the initial authentication request 228 can be produced by the client 201. In another embodiment, the initial authentication request 228, an authentication response 229, and/or a whole or a part of authentication process can be made off of the ledger 207 using conventional data transfer protocols (e.g., HTTP, HTTPS, etc.). In some embodiments, the authentication request 228 can be made using conventional data transfer protocols and the authentication response 229 can be made as an authentication response to the ledger transaction 209 within the ledger 207 or vice versa. In other embodiments, the authentication request 228, the authentication response 229, and/or a whole or a part of authentication process can be based on a ledger transaction from smart contracts to smart contracts and/or as a ledger transaction from smart contracts to random addresses.

In some embodiments, the initial authentication request ledger transaction 209 can be made to the random recipient address in order to protect client and authenticator privacy, such as shown on FIG. 6. In other embodiments, the initial ledger transaction 209 can be made to the ID smart contract 205 and/or the controller smart contract 206 directly from the ledger smart contract 211, such as shown on FIG. 8. However, in a preferred embodiment, the data security management system 100 comprises both the authentication request 228 and the authentication response 229 as the ledger transaction 209 and ledger 207 transaction 204 accordingly to, on one hand, protect both client 201 and authenticator 208 privacy and, on another hand, to leave a traceable track of the authentication event that has happened. Once authentication process transactions are written onto the ledger 207, it is hard to counterfeit them or tamper with them. In some embodiments, the authentication request 228 can be set as a mandatory requirement for authentication so the client 201 can ensure that the authentication request 228 is generated by the authenticator 208. In some other embodiments, any number of data transfer sessions using conventional data transfers protocols can be performed before, after and in time of authentication process in order to share any data and/or metadata needed to perform authentication process between the client 201 and the authenticator 208. Advantageously, the authentication processes described above rule out the need for use of any kind of passwords. Generally, in order to authenticate the client 201, the possession of the private key 203 should be established by the client 201.

Figure 9:
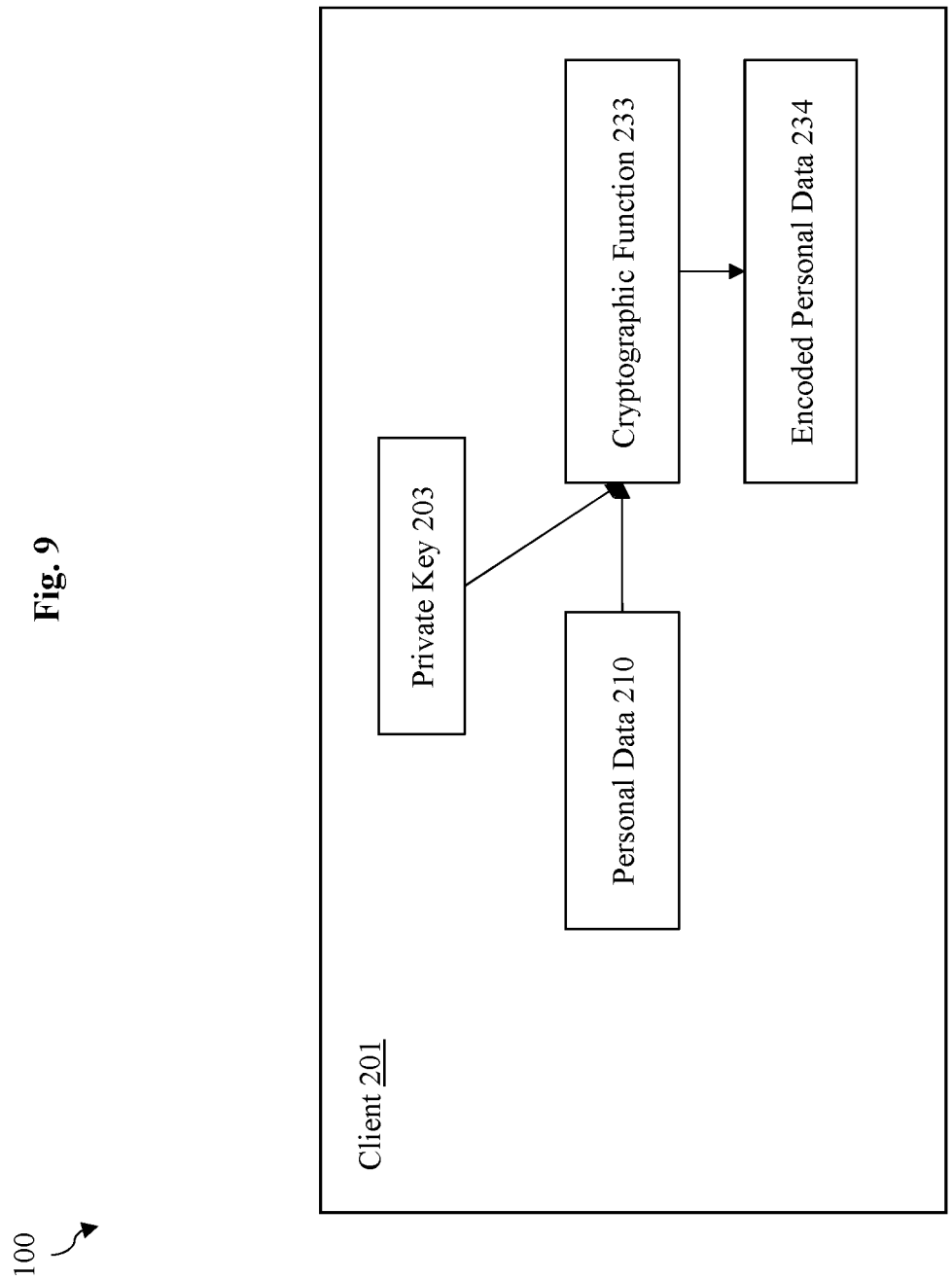
FIG. 9 is an exemplary functional block diagram illustrating one embodiment of a data flow for encoding and storing encoded data using the private key of FIG. 1.

In a preferred embodiment, the client 201 can store personal data 210, such as shown in FIG. 9. The personal data 210 can be added by the client 201, or can be imported from outside of system 100. In some embodiments, the personal data 210 can be encoded (encrypted) and/or protected using the private key 203 and/or the public key 202 and cryptographic function 233. The cryptographic function 233 can include cryptographic primitives such as a one-way hash function and encryption function to produce encoded (encrypted) personal data 234 shown on FIG. 9.

In other embodiments, the personal data 210 can be encoded using another key and/or a password (not shown), different from the private key 203 and the public key 202. In another embodiment, personal data 210 can be encoded, ciphered, and/or obfuscated using biometric identification of the client 201. In even further embodiments, the personal data 210 can be encoded and/or obfuscated using any other strong cipher (e.g., AES, etc.) or using a combination of cryptographic techniques. In yet another one embodiment, personal data 210 need not be encoded, ciphered, and/or obfuscated at all. In some embodiments, the data security management system 100 does not store any personal data 210 anywhere within system 100. Instead, once needed, the personal data 210 can be provided by the client 201 from outside of the system 100.

Figure 10:
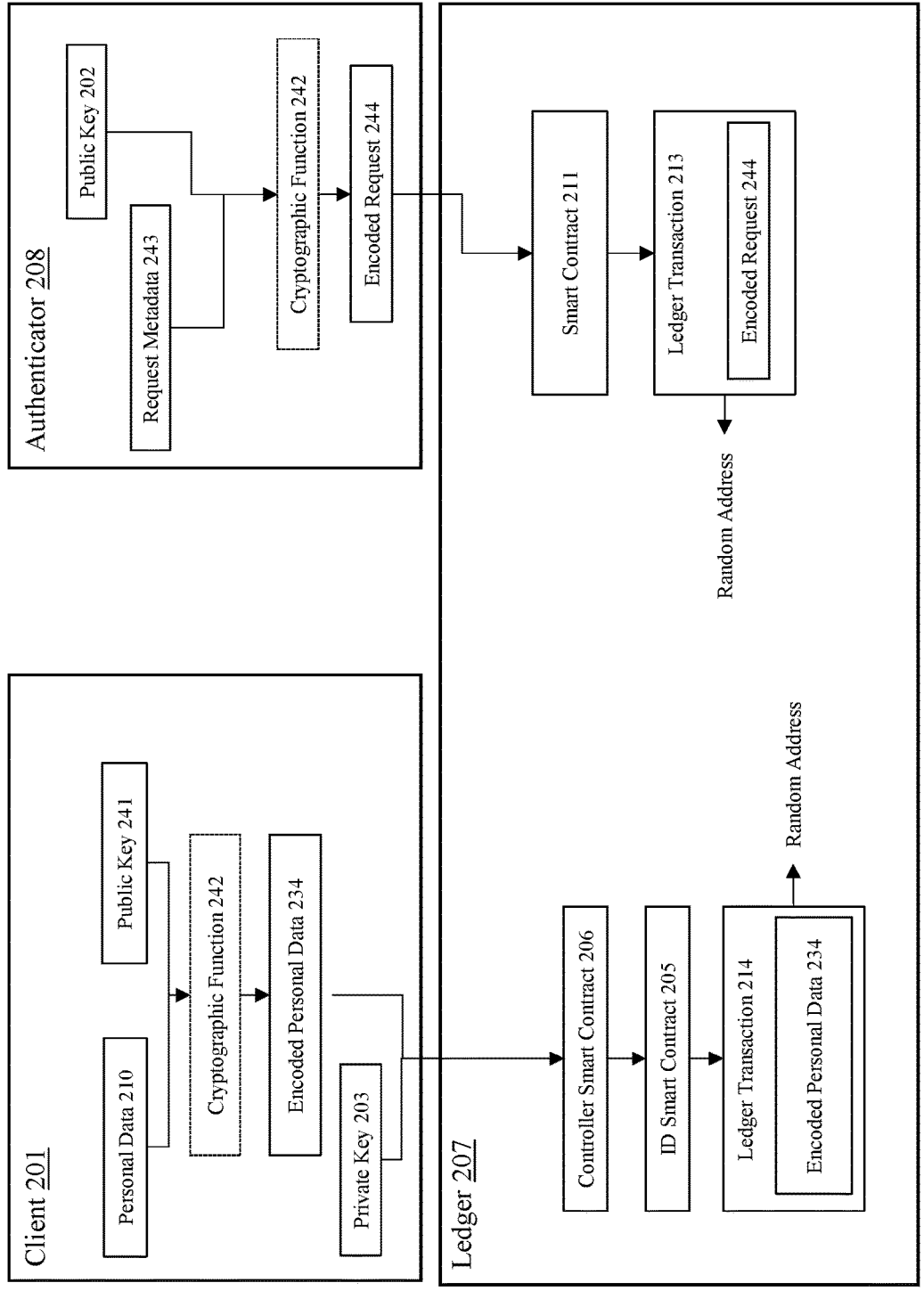
FIG. 10 is an exemplary functional block diagram illustrating one embodiment of a data sharing process between smart contracts using random addresses using the data security management system of FIG. 1.

In a preferred embodiment, the client 201 can send (share) the personal data 210 to any other component within the data security management system 100, including, but not limited to, the authenticator 208. Turning now to FIG. 10, the authenticator 208, having the public key 202 from the client 201 and a request metadata 243, can produce an encoded request 244 using a cryptographic function 242. The cryptographic function 242 can include a one-way hashing function (e.g., MD5, SHA-1, SHA-2, etc.). The encoded request 244 to share personal data 210 from client 201 to authenticator 208 can be placed by the authenticator 208 within a ledger transaction 213.

In some embodiments, the request metadata 243 can represent a pointer on which data is needed to be shared from the client 201. In another embodiment, the request metadata 243 need not be present. In other embodiments, any component within the data security management system 100 can generate the initial request 244 to share the personal data 210 from the client 201 to any other component within system 100, including, but not limited to the authenticator 208. In some other embodiments, the initial request 244 to share personal data 210 to the authenticator 208 from the client 201 can be generated by the client 201.

With reference to FIG. 10, the initial request 244 to share personal data 210 is represented by at least one sharing request ledger transaction 213 of the ledger 207. In some embodiments, the initial sharing request ledger transaction 213 can be generated within one or many ledgers (not shown), different from the ledger 207. In some embodiments, the initial request 244 can be performed off the ledger 207 using conventional data transfer protocols (e.g., HTTP, HTTPS, etc.). In another embodiment, the data security management system 100 comprises a combination of the ledger 207 transaction(s) and conventional data transfer protocols to perform a request to share personal data 210 from client 201.

The sharing request ledger transaction 213 can be made to a random recipient address in order to protect client and authenticator privacy. In a preferred embodiment, contents of the request 244 can be encoded using a public key 241 (of the authenticator 208 known by the client 201), or the public key 202 (of the client 201 known by the authenticator 208), or any other strong cipher. Advantageously, this protects both the request 244 and the response (the encoded personal data 234) from being read by any third party. In some other embodiments, the request 244 can be partially subjected to cryptographic primitives or not subjected at all.

A data sharing response (e.g., the encoded personal data 234) from the client 201 to the authenticator 208 is represented by a ledger transaction 214 that includes encoded personal data 234. In some embodiments, sharing response ledger transaction 214 can be generated within one or many ledgers (not shown), different from ledger 207. In some other embodiments, the sharing response 215 can be performed off the ledger 207 using only conventional data transfer protocols (e.g., HTTP, HTTPS, etc.). In another embodiment, the data security management system 100 uses a combination of the ledger 207 transaction(s) and conventional data transfer protocols to perform a response with shared personal data 210 from client 201.

Figure 11:
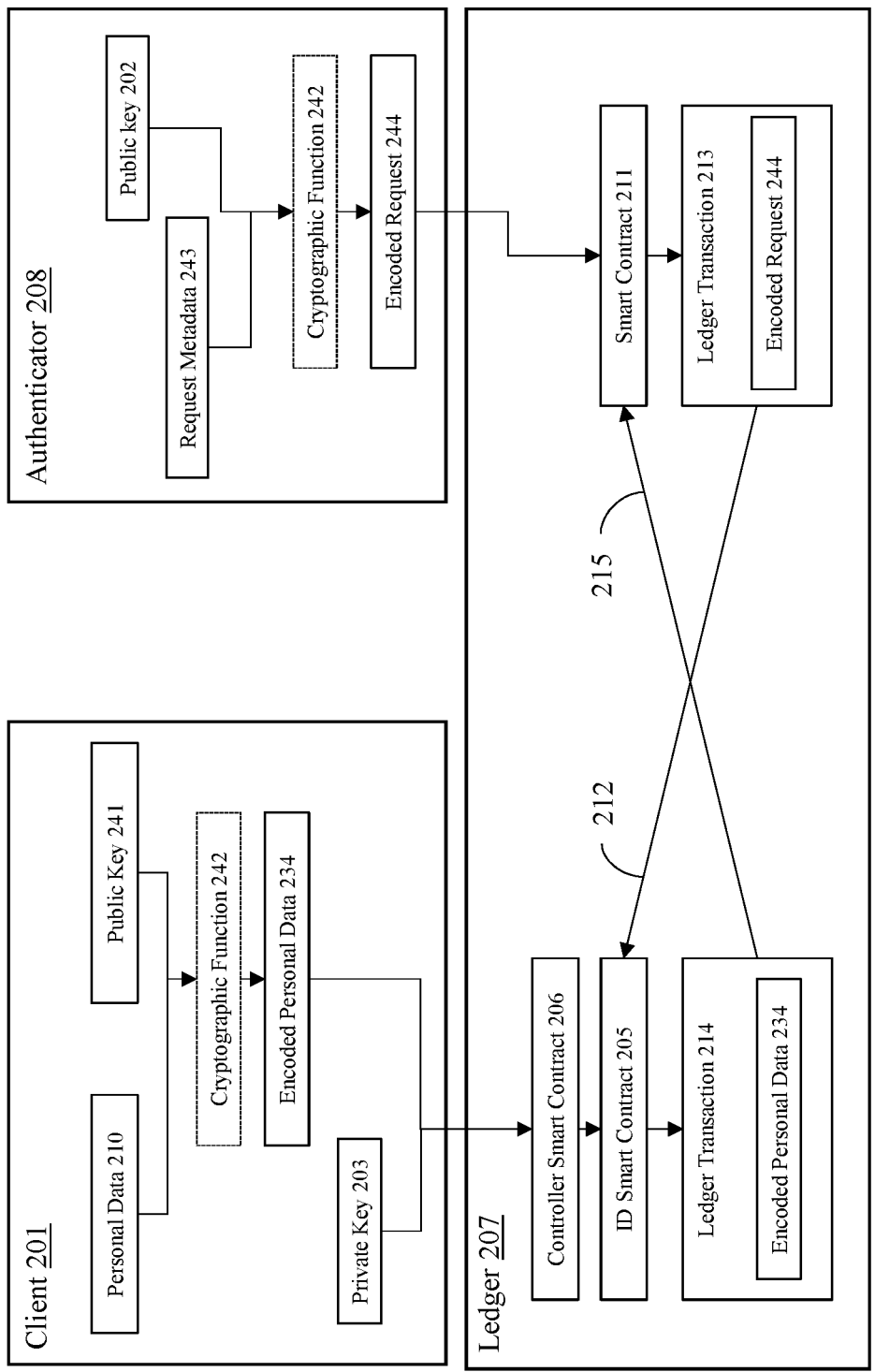
FIG. 11 is an exemplary functional block diagram illustrating another embodiment of the data sharing process of FIG. 10 between smart contracts using direct addresses.

The sharing response ledger transaction 214 can be made to the random recipient address in order to protect client and authenticator privacy. In some embodiments, a sharing response ledger transaction 214 can be made to the smart contract 211 directly as shown in FIG. 11. The contents of response 215 represented by the ledger transaction 214 can be encoded using the public key 241 of the authenticator 208, or any other strong cipher.

In some embodiments, a sharing request 212 can be combined with sharing response 215 within a single data transfer session or ledger 207 transaction. In a preferred embodiment, the authentication process described above can be performed for the client 201 before, after, or simultaneously with data transfer. For example, the authentication process can be a part of the personal data 201 sharing process. In some embodiments, the authentication process can be replaced with a data sharing process because only having an access and being in control of ID smart contract 205 and/or controller smart contract 206, the client 201 can perform a valid sharing ledger transactions.

In some embodiments, the personal data 210 can never leave the client 201. Instead of sharing data in any form, the client 201 can generate a zero-knowledge proof of data existence and knowledge of the personal data 210 without exposure of the personal data 210. In some other embodiments, instead of sharing the personal data 210 from the client 201, the authenticator 208 can instruct the client 201 to generate a verifiable computational result on the client 201 without revealing the data 210 contents. Stated in another way, a private contracts approach, such as the Enigma project/protocol from Enigma, can provide a second-layer, decentralized computational protocol with both guaranteed privacy of data and method for verifiable results.

Figure 12:
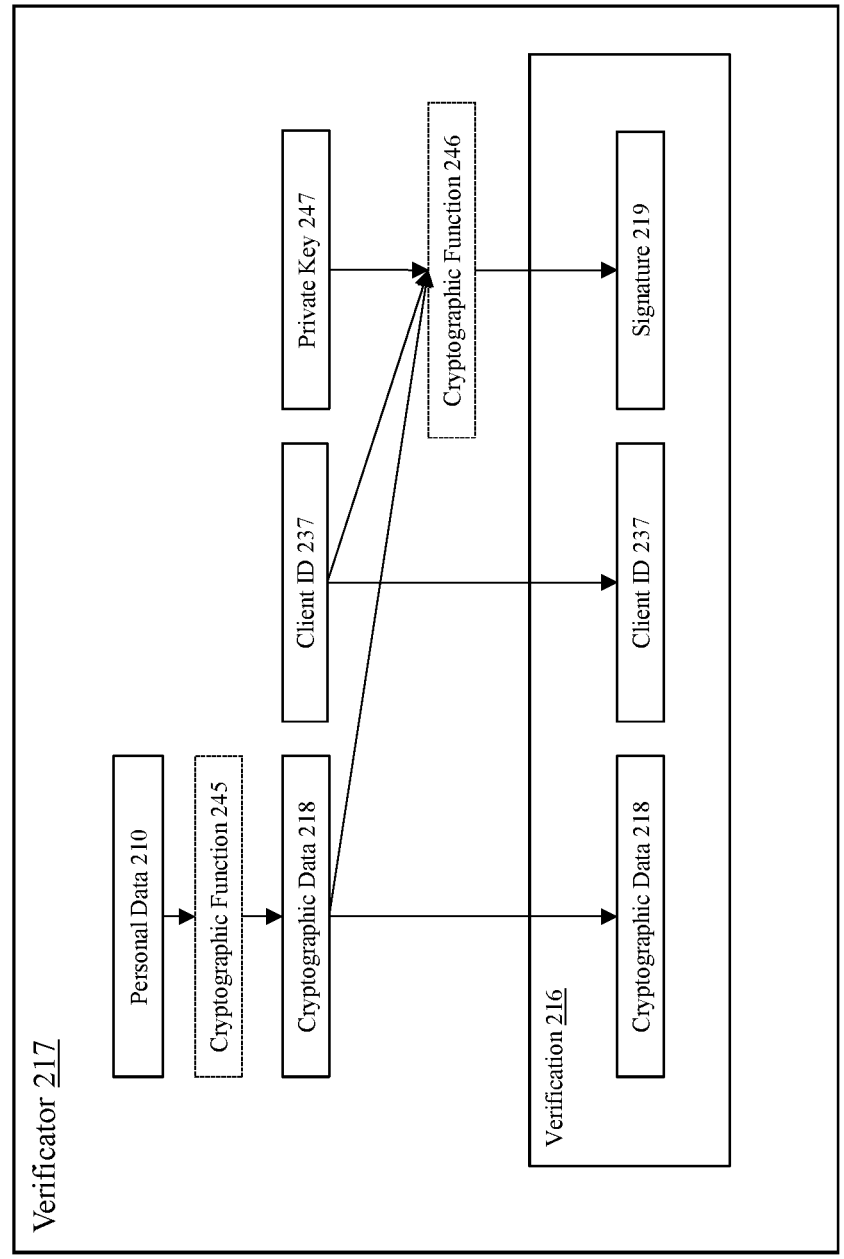
FIG. 12 is an exemplary functional block diagram illustrating one embodiment of verification generation process using the data security management system of FIG. 1.

In a preferred embodiment, each component of the data security management system 100, including the authenticator 208 and a verificator 217 (shown in FIG. 12), can generate a verification 216 of the personal data 210 for the client 201 as shown on FIG. 12. Turning to FIG. 12, the verification 216 can represent a proof of ownership and/or proof of authenticity of a personal data 210. In a preferred embodiment, the verificator 217 can produce the cryptographic data 218 using the personal data 210 and a cryptographic function 245. The cryptographic function 245 can include cryptographic primitives such as a one-way hash function and encryption function. In fact, although shown and described as cryptographic data, the cryptographic data 218 can be partially subjected to cryptographic primitives or not subjected at all. However, the preferred embodiment comprises hashing the personal data 210 to produce cryptographic data 218.

The cryptographic function 245 can include cryptographic primitives such as a one-way hash function and encryption function, such as, for example, a secure hash algorithm SHA-2, SHA-3, or any other reliable cryptographically strong hash function or combination thereof. As shown in FIG. 12, verification 216 includes at least cryptographic data 218, the client identifier 237 within the data security management system 100 and a digital signature 219 made by verificator 217 for the cryptographical data 218 and the client identifier 237 using a verificator private key 247 and a cryptographic function 246. The cryptographic function 246 includes cryptographic primitives such as a one-way hash function and encryption function. In some embodiments, the verification 216 can include any other useful data and metadata, such as a timestamp. In another embodiment, a signature 219 can be made using the cryptographic data 218, the client identifier 237, and the verificator private key 247. The signature 219 also can comprise any other useful data and/or metadata, such as a timestamp. In a preferred embodiment, each component within system 100 can perform an independent check of verification 216 by validating a digital signature 219, such as illustrated on FIG. 15.

In some embodiments, the verification 216 can be stored within storage (not shown). The data security management system 100 is suitable for use with any type of storage, such as a decentralized distributed storage, for example, a distributed hash table, a distributed database, a peer-to-peer hypermedia distributed storage (e.g., InterPlanetary File System (IPFS)), a distributed ledger (e.g., Blockchain), an operating memory, a centralized database, a cloud-based storage, and/or the like. In other embodiments, the storage is not decentralized or comprises a combination of distributed, decentralized servers, and centralized servers. In even further embodiments, the storage can be maintained in operating memory of any component in the data security management system 100. The process of creating, storing, and maintaining consistency of data verifications described herein is also described in commonly-assigned, co-pending application Ser. No. 15/480,313, entitled "Method and System for Managing Personal Information Within Independent Computer Systems and Digital Networks," the disclosure of which is hereby incorporated by reference in its entirety.

In some other embodiments, a verification 216 can be stored within ledger 207 as a transaction or within the ledger 207 smart contract fields. In some embodiments, the storage could be the same as the ledger 207. In some embodiments, the storage can be the same as the ledger 207. In some other embodiments, the verification 216 can be stored within the ledger ID smart contract 205, ledger controller smart contract 206, and/or ledger smart contract 211. In other embodiments, the verification 216 can be stored within the client 201, verificator 218, and/or authenticator 208. In another embodiment, the verification 216 can be stored outside of the data security management system 100 or disposed after processing to avoid any chance of theft. In yet another one embodiment, the verification 216 can be hashed, encoded, and/or ciphered for additional privacy.

Figure 13:
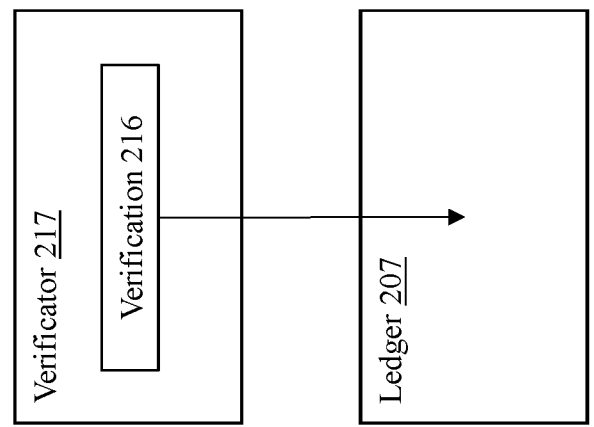
FIG. 13 is an exemplary top-level block diagram illustrating one embodiment of verification transaction within the distributed ledger using the data security management system of FIG. 1.

Turning to FIG. 13, the data security management system 100 encodes the verification 216 onto the ledger 207. In other embodiments, the verification 216 can be encoded onto a ledger (not shown), different from the ledger 207. In some embodiments, the data management security system 100 provides the safety and integrity for multiple amounts of verifications 216 within the data security management system 100, all within the parameters of a single ledger transaction on the ledger 207. By way of example, novel systems for storing data in a decentralized manner, while simultaneously having data integrity and consistency are disclosed in commonly assigned, co-pending U.S. application Ser. No. 15/480,313, filed Apr. 5, 2017, which application is hereby incorporated by reference in its entirety and for all purposes. In some embodiments, each transaction corresponds to a single verification 216. In alternative embodiments, each transaction represents a set of verifications 216.

Figure 14:
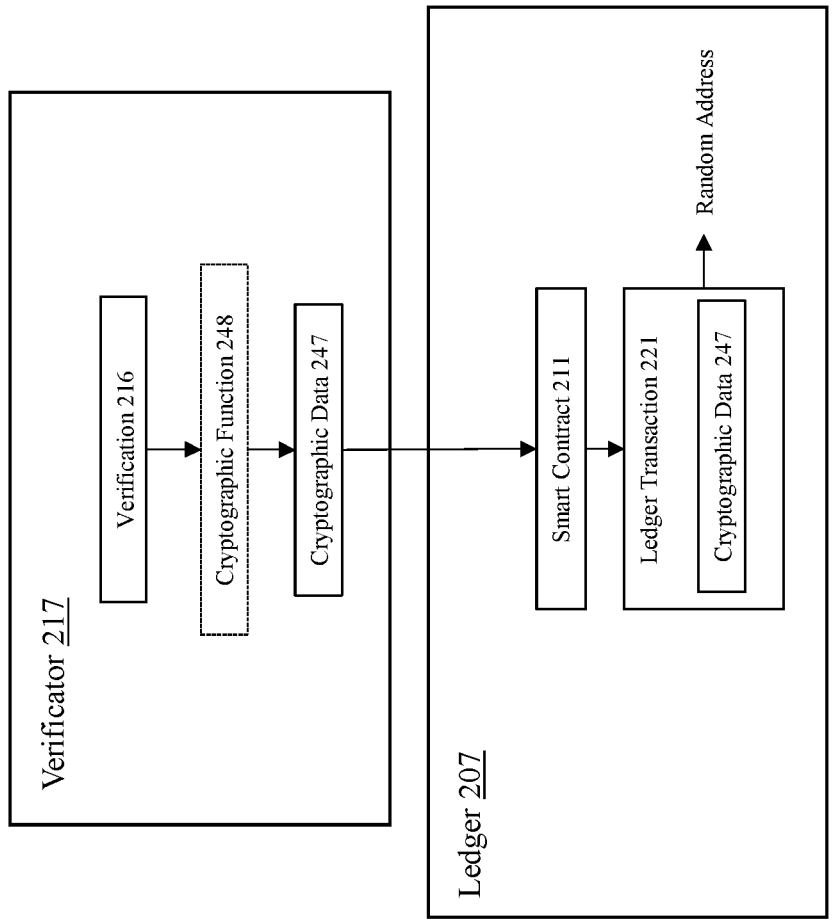
FIG. 14 is an exemplary functional block diagram illustrating one embodiment of a process for one verification transaction generation within the distributed ledger using the data security management system of FIG. 1.

In a preferred embodiment, each new verification 216 generates a ledger transaction 221 into the ledger 207 as shown on FIG. 14. Verificator 217 can produce the cryptographic data 247 using verification 216 and cryptographic function 248, such as cryptographic primitives including, but not limited to one-way hash functions and encryption functions. The verificator 217 can then generate a ledger transaction 221 within ledger 207 containing cryptographic data 247. In some embodiments, the data security management system 100 can secure several independent verifications 216 within a single ledger transaction 221, within the ledger 207. In some embodiments, the ledger transaction 221 can be sent to a random address for better privacy as shown on FIG. 14. In some embodiments, the ledger transaction 221 can be made using client 201 ID smart contract 205 and/or controller smart contract 206 direct addresses (e.g., ledger contract id).

Figure 15:
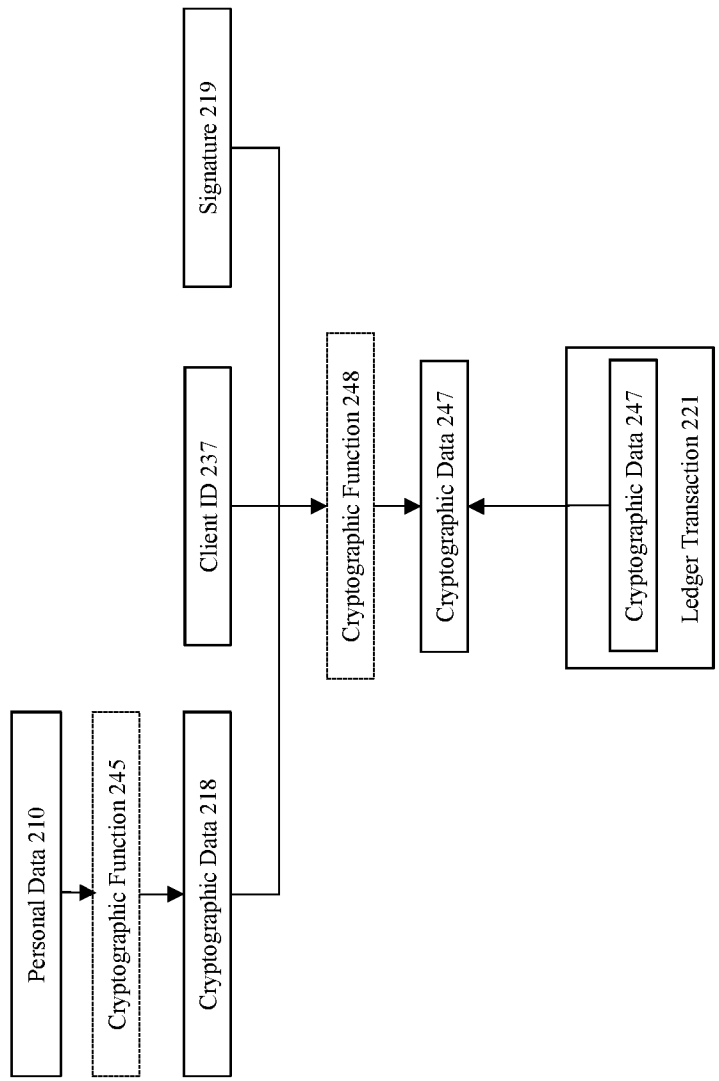
FIG. 15 is an exemplary functional block diagram illustrating one embodiment of a verification validation using the data security management system of FIG. 1.

In a preferred embodiment, any personal data 210 being shared from client 201 to any other component within the data security management system 100 can be independently checked for verifications 216 made for client 201 for the personal data 210 as shown in FIG. 15. A need to check for existence and validate verifications made for the personal data 210 of the client 201 includes generation of the cryptographic data 218 using the personal data 210 and a cryptographic function 245. As illustrated on FIG. 15, the cryptographic data 218 can be coupled with the client identifier 237 and the signature 219 to produce the cryptographic data 247 using cryptographic function 248, such as cryptographic primitives including, but not limited to one-way hash functions and encryption functions. The combination of the personal data 210, client ID, and signature used to generate the cryptographic data 247 can be checked (via independent generation of cryptographic data 247) and compared to the cryptographic data 247 stored within the ledger 207 transaction 221 to establish data validity and verification authenticity.

In some embodiments, the data security management system 100 can be used with systems for determining the level of trust that is required to engage in a transaction through a dynamic client-side scoring function. Judgment about whether to refer to specific data with confidence always depends on the internal business processes of the organization, the level of certification (compliance), and the requirements of legislation. For example, while sufficient to verify age when purchasing alcohol, conventional methods of age verification are not appropriate for the commercial bank when opening an account. Accordingly, novel systems for determining the level of trust that is required to engage in a transaction are disclosed in commonly assigned, co-pending U.S. application Ser. No. 15/480,313, filed Apr. 5, 2017, which application is hereby incorporated by reference in its entirety and for all purposes.

The data security management system 100 exponentially improves trust-based decision making by allowing information sharing, without running afoul of data privacy laws that significantly restrict data collection, use, and sharing activities. Among other ways, the data security management system 100 enables transmission (inbound and outbound) of identity flags that can be used to improve risk assessment—in the case of airlines for any would-be passenger in advance of them reaching the airport, regardless of whether they have flown with your airline before or not.

The solution overcomes the traditional challenges of using blockchain technology, demonstrated by recent events that have exposed problems related to bandwidth reduction, hard forks and loss of customers by taking a blockchain agnostic approach. Through aggregation and cross checking, the use of multiple blockchains addresses the general challenge that blockchain could, by itself, constitute a single point of failure, and the more specific challenge of private blockchains, which are often characterized by lower security levels.

It addresses the principal security challenge by depersonalizing data stored to the blockchain through a special shuffle and dice algorithm. The resulting mathematical representation of the actual data, if stolen, would be veritably useless. Yet, it still enables completeness and adequacy necessary for making trust-based decisions. This obfuscated data stored in the blockchain obviates the need of higher security to protect any underlying sensitive/personal data, and the risk of backdoors.

A blockchain-agnostic approach can decentralize the data security management system 100, avoid a single-point-of-failure problem, and create a trusted identity management system with obfuscated data that can be independently validated.

The advantages of the data security management system 100 include managing and storing personally identifiable data:

without storing open and/or meaningful data in a centralized storage available to hack/steal, making hacking attempts unappealing, without storing any personal data in any form anywhere except of client' devices, de-risking any central-storage of client data by a company which is currently used, without storing and using passwords, which may have been proved ineffective and insecure, without any centralized databases/authorities/third parties which must be relied on while providing data consistency and integrity at the same time.

Applications

The systems and methods disclosed herein may be used in many different contexts in which Identity verification or access management is required, such as applications for external uses, including:

Online services, including dating/professional service providers, whereby individuals interact in the digital as well as the physical world—with an emphasis on name and age verification, background checks.

Employment—verification of work permits and entry documentation/immigration, as well as associated background checks on individual identity and their attributes.

Adult Entertainment—Age verification, payment verification, fraud detection.

Gambling—Age verification, payment verification, fraud detection, previous user history and associated credit checks.

Immigration and cross-border movement of individuals—identity documents checks, background checks and paperwork validity, citizenship and permits to travel, validating claims of identity and identity attributes.

Fintech—digital banking security, transaction security, identity claims for financial fraud and access to funds or financial services, clearance and compliance activity.

Debit/Credit Cards—Anti-money laundering (AML), fraud detection, transaction security, clearance verifications and card replacement authentication.

Credit referencing and rating agencies—assurance of identity, fraud, previous behavior history, risk-based assessments.

National and International Travel—identity checks for country of destinations and their border authority, no fly lists, Interpol, politically exposed persons (PEP) lists, relevant law enforcement and government authorities, border control agencies, airport infrastructure, security and customs.

Airline security, airline know your customer (KYC) processes, passenger identification and risk assessment, inter-airline passenger behavior history, flight manifest verification, passport and visa checks, passport verification, identity document verification, booking data verification and accuracy checks (including online and mobile booking), fraud detection for payment, fraud detection for loyalty program claims and abuses, identity claim verification, advanced passenger information systems (APIS) verification and passenger reputational scoring.

Data Entry—Correcting human error, automating correct entry process (e.g., Companies House data input (which is currently manual), International travel passenger data input, Credit referencing and rating agencies—all of this is manual, subject to human error and potential lack of attention to detail/quality staff training/impossibility of catching an error (for example, one as minute as a zero instead of the letter 'O').

Insurance—delayed flight insurance, credit card fraud insurance, mortgage insurance, payment default insurance. Risk assessment for insurance premiums calculations, as well as trust score used for premium payouts and claims assessments.

Government Services—taxation, pensions, income declaration, revenue and customs assessments, tax evasion, etc.

National and International Individual Identity—documentation for car hire, real estate, medical services, and the need to verify both its veracity and validity as well as assert ownership, or a transfer of ownership Legal records—verifying the existence of and veracity of claimed legally recorded proceedings and documentation, verifying their source and the individual to whom they pertain Fraud protection—decentralized automated and client-controlled monitoring for fraud activities and unusual patterns in identity use or behavior, aggregate risk assessment, fraud detection and prevention.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for data security management, comprising:
generating a pair of cryptographic keys comprising a public key and a private key;
assigning the generated pair of cryptographic keys to a client device;
creating an associated ledger identification smart contract in a distributed ledger, the ledger identification smart contract being identified by a contract identifier, the generated private key protecting the control of a controller smart contract that controls the associated ledger identification smart contract;
authenticating the client device at an authenticator based on the generated private key, wherein authenticating the client device comprises:

receiving an authentication request from the client device at the authenticator;
generating a random value;
transmitting the random value to the client device;
producing authenticator cryptographic data at the authenticator using a cryptographic function based on the contract identifier and the generated random value;
creating a ledger request transaction that includes the produced authenticator cryptographic data using an authenticator smart contract of the distributed ledger;
producing client cryptographic data at the client device using the cryptographic function and the transmitted random value; and
producing at least one authentication response ledger transaction that includes the produced client cryptographic data, the at least one authentication response ledger being a verification of possession of the private key by the client device to the authenticator; and
receiving an authentication response comprising an authentication ledger transaction in the distributed ledger.

2. The method of claim 1, further comprising storing personal data on the client device.

3. The method of claim 2, further comprising sharing the stored personal data to the authenticator by generating a sharing request ledger transaction of the distributed ledger.

4. The method of claim 3, further comprising receiving a data sharing response from the client at the authenticator by generating a sharing ledger transaction within the distributed ledger.

5. The method of claim 2, further comprising verifying the personal data for the client representing a proof of ownership of the personal data.

6. The method of claim 1, wherein said generating comprises protecting the pair of cryptographic keys with biometric data.

7. The method of claim 1, further comprising encrypting the generated private key using a cryptographic primitive.

8. The method of claim 1, wherein said distributed ledger comprises at least one of an immutable distributed ledger, a public ledger, and a private ledger.

9. The method of claim 1, wherein said contract identifier represents a client identifier of the client device.

10. A system for data security management, comprising:
a client device for generating a pair of cryptographic keys comprising a public key and a private key;
an authenticator in communication with the client device for authenticating the client device based on the generated private key, wherein authenticating the client device comprises:
receiving an authentication request from the client device;
generating a random value;
transmitting the random value to the client device;
producing authenticator cryptographic data at the authenticator using a cryptographic function based on the contract identifier and the generated random value;
creating a ledger request transaction that includes the produced authenticator cryptographic data using an authenticator smart contract of the distributed ledger;
producing client cryptographic data at the client device using the cryptographic function and the transmitted random value; and
producing at least one authentication response ledger transaction that includes the produced client cryptographic data, the at least one authentication response ledger being a verification of possession of the private key by the client device to the authenticator; and
a distributed ledger in communication with the client device and the authenticator, wherein the distributed ledger manages an associated ledger identification smart contract, the ledger identification smart contract being identified by a contract identifier, the generated private key protecting the control of a controller smart contract that controls the associated ledger identification smart contract, the distributed ledger further for generating an authentication response comprising an authentication ledger transaction.

11. The system of claim 10, wherein said client device further stores personal data.

12. The system of claim 11, wherein said authenticator receives the stored personal data from the client device via a sharing request ledger of the distributed ledger.

13. The system of claim 12, wherein said client device transmits a data sharing response to the authenticator by generating a sharing ledger transaction within the distributed ledger.

14. The system of claim 11, wherein said authenticator further verifies the personal data for the client representing a proof of ownership of the personal data.

15. The system of claim 10, wherein said client device further protects the generated pair of cryptographic keys with biometric data.

16. The system of claim 10, wherein said client device further encrypts the generated private key using a cryptographic primitive.

17. The system of claim 10, wherein said distributed ledger comprises at least one of an immutable distributed ledger, a public ledger, and a private ledger.

18. The system of claim 10, wherein the contract identifier represents a client identifier of the client device.

* * * * *